July 13, 1965     C. H. T. WOODWARD     3,194,091
HOLLOW DRILLS

Filed July 23, 1963     2 Sheets-Sheet 1

INVENTOR.

INVENTOR.
Cyril Horace Woodward

United States Patent Office 3,194,091
Patented July 13, 1965

3,194,091
HOLLOW DRILLS
Cyril H. T. Woodward, 160 Howard Ave.,
Rochelle Park, N.J.
Filed July 23, 1963, Ser. No. 297,000
3 Claims. (Cl. 76—108)

This invention pertains to "hollow drills" of the type used for perforating or cutting holes in paper, cardboard, paperboard and various laminates. In particular, this invention relates to "hollow drills" having separable parts, whereby the worn or damaged cutting element may be discarded and replaced at low cost by a new element; and more particularly this invention relates to "hollow drills" and the process of making said drills wherein one of the elements is a shaped tubular cutting members adapted to be releasably retained in a shank socket.

In the use of paper drills of commercial construction, commonly termed "hollow drills," there are many limitations to the effectiveness of these drills in their operation. Paper and associated products are customarily treated, blended or surfaced with materials such as "clay" which material is often highly abrasive. The cutting of these materials result in a dulling of the drill which if not detected by the operator causes a clogging of the drill resulting in torn, mutilated or irregular cut holes in the paper being drilled. This also causes drills to break as well as producing a very hard machine operation. A correction of this condition caused by the dull or broken drill requires a shutting down of the machine, removing the drill to sharpen and/or replace the drill in the machine so as to resume work.

It is contemplated that my invention will provide a drill assembly wherein the drill shank may be retained for further use and the drill portion may be economically replaced. It is further intended that the process of making this drill portion will produce a quality controlled element of high wear properties at low cost.

It is further contemplated that my invention will provide a drill that will operate at high speeds and low friction so as to permit the cuttings to readily pass through the drill, said drill having a predetermined restrictive passageway at the cutting end so as to form into cup-shaped discs the paper cuttings produced by drilling these discs having a diameter less than the diameter of the cutting edge and also the greater portion of the drill passageway.

In the attainment of these advantages and other objects, I provide a drill having a shank or receiving portion member whose outer surface is machined or formed so as to be readily mounted in the sockets of drill spindles of conventionally used commercial machines. As reduced to practice, this member is made of cold rolled steel and is used in a non-heat treated condition. The drill portion is made of alloy material and from drawn seamless tubing which is cut to length, one end of the cut tube is then tapered to a predetermined size and length, this resulting member is then heat-treated to a predetermined hardness. This hardened tube element is now ground to a precise outside diameter, a tapered shank engaging portion is then formed on the internal non-tapered end and the opposite end is then internally beveled to form a cutting edge on this end.

The drill assembly acording to my invention comprises the novel formation of components as well as the several steps used in making the drill unit. These features of construction, combination of elements and arrangement of parts as well as the steps in producing such elements are exemplified in the following detailed disclosure, and the scope of the application of which is indicated in the claims.

These and other objects of the present invention as well as its advantages, nature and substance will be more clearly perceived and fully understood by referring to the following description and accompanying drawings, in which.

Figures 1, 2, 3, 4, 5:
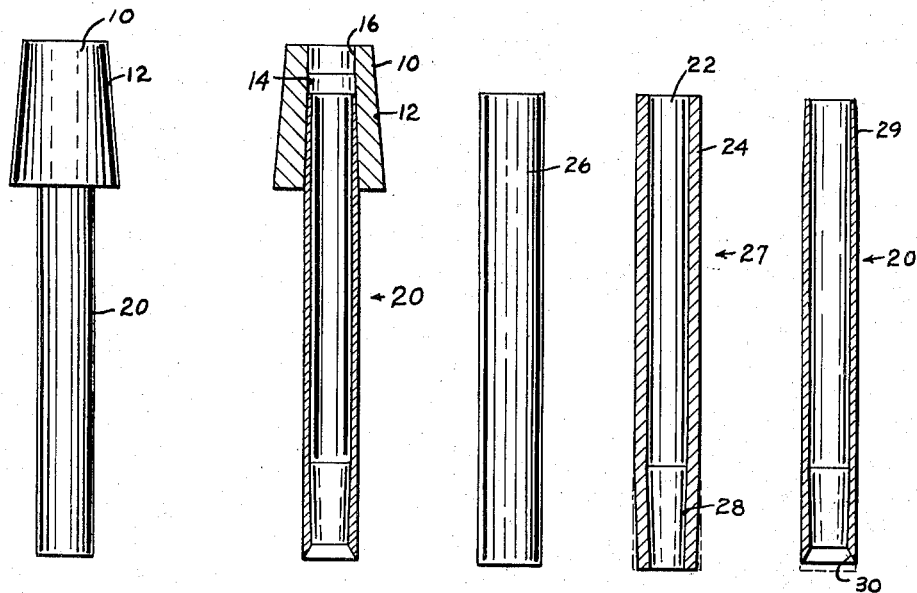
FIG. 1 is a side view of an assembled drill having a shank and tube member.
FIG. 2 is a sectional side view of the drill assembly of FIG. 1.
FIG. 3 is a side view of a cut tubular member before forming or further processing.
FIG. 4 is a sectional side view of the tube member of FIG. 3 after one end has been predeterminedly tapered.
FIG. 5 is a sectional side view of the tubular cutting member ready for insertion into the shank member.

Referring more particularly to the drawings wherein similar characters designate corresponding parts throughout, the general arrangement of the components forming the preferred embodiment of the "hollow drills" is shown in FIGS. 1 through 5 and includes a shank 10 which in the present instance is formed from cold rolled steel. The outer surface 1 of shank 10 is shaped to suit the various commercial drilling machines, such as Lawson, Seybold, Rosback, Wright, Nygren Dahly, Superspeed, Challenge, Climax, Lasco, Pioneer and others. This surface 12 may be tapered, as shown, or cylindrical with grooves or keyways to suit any of the many socket means the designer of the drilling machine may incorporate into his unit. Axially formed through the shank 10 is a passageway including a tapered portion 14 and a final straight portion 16. The tapered portion 14 as reduced to practice, is a locking taper of one-eighth inch diametrical taper per foot and is made one-half inch long.

A finished drill member 20 as shown in FIG. 5 is in the present instance made of SAE 4140 steel tubing. This tubing is of aircraft quality and is seamless with a smoothly finished inside surface. This tubing is secured with the inside passageway 22 of a predetermined diameter and the wall 24 of a selected thickness. From longer lengths of tubing, a definite length of tubing 26 is cut for further processing. The tube is then tapered on one end to produce an internal taper on one end resulting in a tapered tube member 27. In the preferred embodiment of a drill unit such as is used for the quarter-inch drills, an internal taper of one-quarter inch per foot (on a diametrical measurement) is used. This internally tapered portion 28 is produced by swaging one end of the tube for about three-quarters of an inch. The swaging causes the tube wall 24 to be forced inwardly to the desired internal taper. This swaging is done with a die and as a "cold" forging process. The alloy material, already work treated in the process of being drawn to size, is further work treated to compact the grain structure thereof by this step of swaging. As the step of swaging causes an inward displacement of the metal, the outer taper must be slightly less than the inner taper and while the volume of metal remains the same, as the outer diameter is reduced, the inner diameter is reduced in relation to the volumetric reduction of the outer diameter. In the reduction to practice, for example, of a quarter inch drill, the small end of the taper on the inside is brought to a diameter of two-hundred and six thousandths of an inch while passageway 22 as formed in the production of the tube is two hundred and twenty-nine thousandths of an inch in diameter.

The tapered tube member 27 is now heat treated to produce a maximum toughness combined with hardness. In the present instance the SAE 4140 material carburized to a depth of twenty-five thousandths which in effect nearly through carburizes the resulting drill. This drill member is then stress relieved for ten hours with a draw at six hundred degrees Fahrenheit then air cooled. The treated member is then given a hot water soak, the interior is vapor blasted or honed to remove scale and to restore the inside to a smooth drawn surface. The blank is then pickled and checked to be sure that the part has a Rockwell reading of approximately fifty to fifty-four on the "C" scale.

The finishing of tapered tube member 27 to produce the drill of FIG. 5 includes the following processing steps. The tapered tube member 27 is reduced by centerless grinding to a precise diameter as established by general commercial use, as for example, a drill of one-eighth inch designation has an outside diameter of one hundred and thirty thousandths of an inch, while a drill of one-quarter inch designation had an outside diameter of two hundred and sixty thousandths of an inch diameter. Other drills also have outside diameters from five to ten thousandths of an inch larger than nominal size so as to ensure that the drilled hole will be at least the nominal size. The centerless ground drill of the previous step is next ground so as to produce a tapered portion 29 one-half inch in length and with a taper of one-eighth inch per foot as measured on the diameter. This taper is about ten thousandths of an inch per inch or about five thousandths of an inch for the half inch of taper produced. This tube member now is finished as regards the outer surface and the next step is to chamfer the front or cutting end. A chamfered surface 30 of about thirty degrees included angle with the outer surface is formed on the end of the tube. To provide a cutting edge that is square with the outside surface and to insure that this edge has no irregularities of material composition that may arise from the heat treating process, there is removed a small portion of the end as indicated in phantom outline in FIG. 5.

For the purpose of illustration there are shown two different internal tapers as used in the front or cutting end of the drills. Many experiments have determined that the maximum efficiency, or ease of drilling is obtained when the front inside diameter is approximately seventy-eighty to eighty-two percent of the outside diameter. If the inside diameter is made smaller, a greater resistance in producing the cutting would result, and if a larger inside diameter is used there would be a very short taper or a thin wall.

Figures 6, 7, 8:
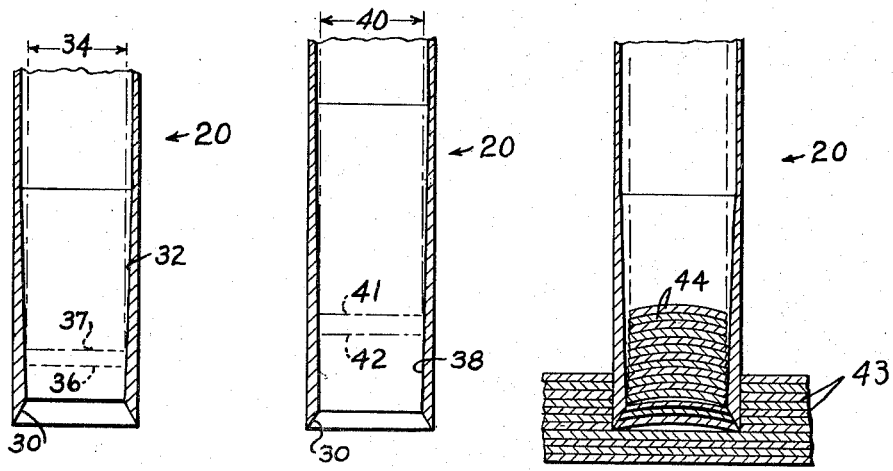
FIG. 6 is a partial sectional view in enlarged scale showing the cutting drill tip of the drill of FIG. 5.
FIG. 7 is a partial sectional view in an enlarged scale showing a cutting drill tip similar to the drill of FIG. 6, but with a lesser internal angle.
FIG. 8 is a partial somewhat diagrammatic sectional view in an enlarged scale showing the drill tip of FIG. 7 as it cuts into layered paper.

In FIG. 6 is shown an internally tapered surface 32 which for the purpose of illustration is exaggerated and which as reduced to practice, is a tapered section of one-quarter inch per foot or about twenty thousandths of an inch per inch on the diameter. When this taper is used the front inside diameter is seventy-nine percent of the outside diameter of the drill and the "chip" or cutting is formed into a diameter 34 which in most paper stocks is equal to the taper diameter at a point about one hundred to one hundred and fifty thousandths of an inch inwardly of the minimum diameter at the back of bevel surface 30. These points of location on the taper diameter are indicated by phantom outline and indicated by numbers 36 and 37.

In FIG. 7 is shown an internally tapered surface 40 which for the purpose of illustration is also exaggerated and which as reduced to practice is a taper of one-eighth inch per foot or about ten thousandths of an inch per inch on diameter. When this taper 38 is used the front inside diameter is eighty-two percent of the outside diameter of the drill and the "chip" is formed into a diameter 40 which in most paper stocks is equal to the taper diameter at a point about one-quarter of an inch to three-eighths of an inch, as indicated by numbers 41 and 42, inwardly of the minimum diameter at the back of bevel surface 30.

In FIG. 8 is illustrated the result of a rotating hollow drill 20 entering a layered pile of paper 42. The drill tip of this figure is the same as FIG. 6 and the cutting edge formed by bevel 30 has entered several layers of paper. As the drill cutting edge cuts the paper, the chips are started to form by being forced upwardly to the restriction and thence up the tube. As the chips leave the restriction they expand slightly to a generally fixed diameter 34 and at this diameter they proceed as chips 44 up the drill passageway as indicated in phantom outline.

Figure 9:
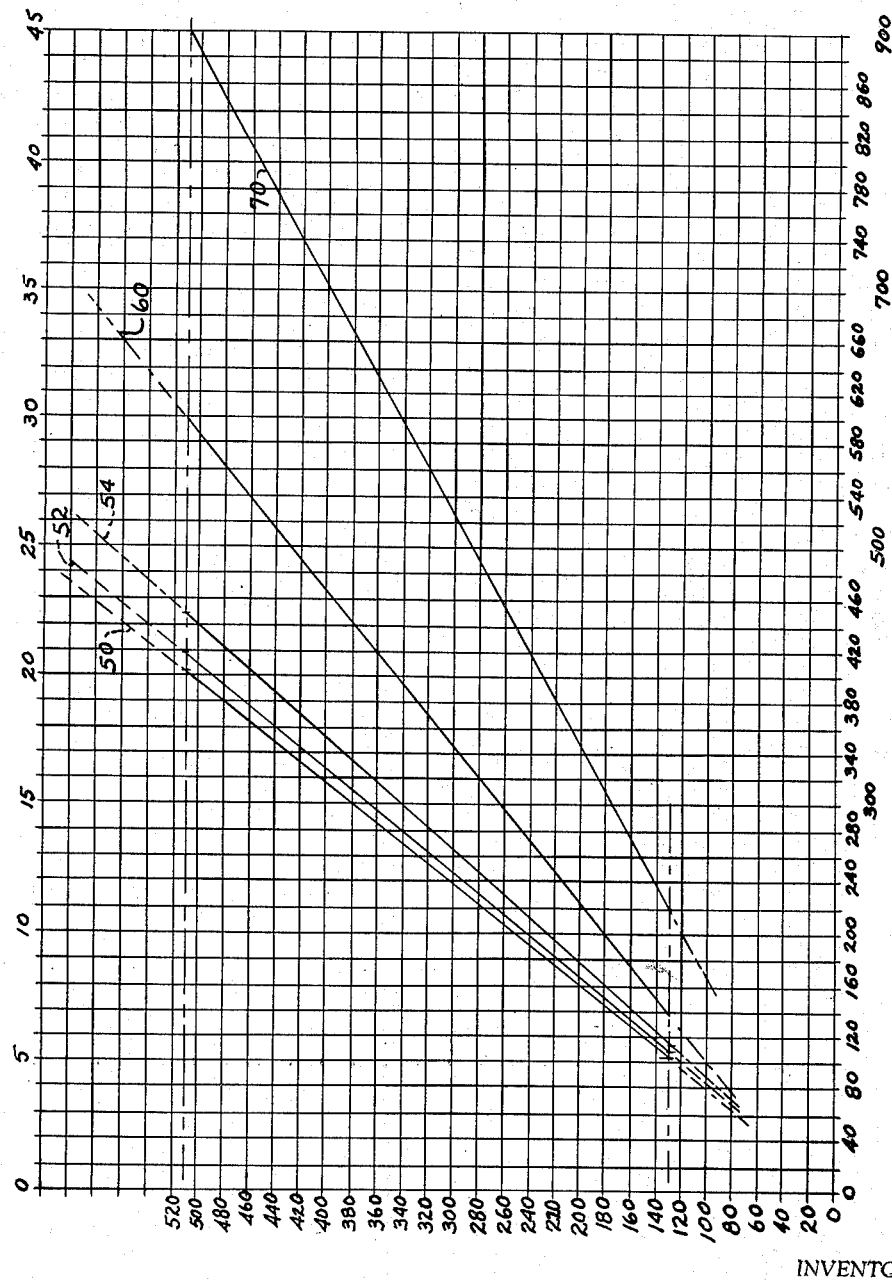
FIG. 9 is a chart diagram showing the relative relationship of the various critical dimensions affecting the construction of the drill member.

In FIG. 9 is shown a chart upon which pertinent data is diagrammatically presented. The vertical ordinates are in thousandths of an inch while the horizontal ordinates on the bottom are also in thousandths of an inch. The vertical ordinate is for the outside diameter of the drill 20. Line 50 shows the inside restriction diameter for a quarter inch per foot taper. Line 52 shows the inside restriction diameter for an eighth of an inch per foot taper. Line 54 shows the inside diameter of the passageway 22.

Phantom lines have been placed on the chart, the lower line indicating an outside diameter of one hundred thirty thousandths of an inch and the upper line indicating a diameter of five hundred ten thousandths of an inch.

Also on the chart are two lines indicating the amount of restriction for the various sizes of drills. Line 60 indicates the restriction for one-eighth inch per foot taper while line 70 indicates the amount of taper for one-quarter inch per foot. The amount of restriction is read on the ordinate at the top of the chart.

Representative readings on the chart are:

| Line | 50 | 52 | 54 | 60 | 70 |
|---|---|---|---|---|---|
| At .130 dia | .103 | .107 | .114 | .007 | .011 |
| At .510 dia | .403 | .418 | .448 | .030 | .045 |

While the invention has been described in detail with respect to a preferred embodiment, it will be understood by those skilled in the art that various modifications may be made without departing from the spirit and scope of the invention and it is intended to cover all such changes and modifications in the appended claims.

I claim:

1. In a hollow drill assembly having a shank and a drill member removably mounted in a socket of the shank, the drill assembly being designed for use in a socketed drill spindle, the process of forming the removable drill portion comprising the steps of:
   (1) cutting a length of tubing of selected outside and inside diameters from a length of tubing of such sizes;
   (2) inserting the tubing into a tapering die adapted to engage and swage an end portion when forced into said die, the portion thus tapered providing a like tapered portion on the internal bore of the tube;
   (3) treating the tube to produce desirable wear properties;
   (4) grinding the entire length of the exterior of the tube including the swaged portion to produce a tube having a relatively constant preselected diameter;
   (5) forming an external taper on the end of the tube opposite the internally tapered tube end; and
   (6) internally chamfering the internally tapered end to form a cutting edge at the exterior diameter portion of the tube.

2. In a hollow drill assembly having a shank and a drill member removably mounted in a socket of the shank, the drill assembly being adapted for use in a socketed drill spindle, the process of forming the component parts of the assembly comprising the steps of:

(1) forming a shank with a passage and a socket in one end of the passage;
(2) cutting a length of tubing of selected outside and inside diameters from a length of tubing of such size;
(3) inserting the tubing into a tapering die adapted to engage and swage an end portion when forced into said die, the portion tapered thusly, providing a like tapered portion on the internal bore of the tube;
(4) heat treating the tube to produce desirable wear properties;
(5) grinding the entire length of the exterior of the tube including the swaged portion to produce a tube having a relatively constant preselected diameter;
(6) forming a socket engaging portion on the end of the tube opposite the internally tapered tube end, the socket engaging portion being adapted to form a locking engagement with the socket of the shank; and
(7) internally chamfering the internally tapered end to form a cutting edge at the exterior portion of the tube.

3. The process of claim 2 wherein the socket of the shank is formed with a taper of approximately ten-thousandths of an inch per inch and the external taper on the drill is made of a like amount, and wherein the tubing is alloy steel heat treated to a core hardness of 50–54 Rockwell "C" and a skin hardness of approximately 60–62 Rockwell "C."

References Cited by the Examiner
UNITED STATES PATENTS

| | | | |
|---|---|---|---|
| 1,285,589 | 11/18 | Barnes | 76—108 |
| 1,651,795 | 12/27 | Wright | 76—108 |
| 1,718,210 | 6/29 | Armstrong | 76—108 |
| 1,763,651 | 6/30 | Gumaelius | 76—108 |
| 2,606,615 | 8/52 | Pevey et al. | 77—69 |
| 2,923,180 | 2/60 | Dunn et al. | 77—69 |

GRANVILLE Y. CUSTER, Jr., *Primary Examiner.*

WILLIAM W. DYER, Jr., *Examiner.*